(12) United States Patent
Matsumoto et al.

(10) Patent No.: US 11,242,829 B2
(45) Date of Patent: Feb. 8, 2022

(54) FUEL PUMP MODULE, FUEL SUPPLY DEVICE, AND METHOD OF INSTALLING FUEL PUMP MODULE IN FUEL TANK

(71) Applicants: DENSO CORPORATION, Kariya (JP); TOYOTA JIDOSHA KABUSHIKI KAISHA, Toyota (JP)

(72) Inventors: Teppei Matsumoto, Kariya (JP); Takemasa Fujiseki, Kariya (JP); Shinichi Morita, Toyota (JP); Shoma Fujita, Toyota (JP); Koji Maruyama, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/034,352

(22) Filed: Sep. 28, 2020

(65) Prior Publication Data

US 2021/0095624 A1    Apr. 1, 2021

(30) Foreign Application Priority Data

Sep. 30, 2019    (JP) .............................. JP2019-178272

(51) Int. Cl.

| | |
|---|---|
| *F02M 37/44* | (2019.01) |
| *F02M 37/04* | (2006.01) |
| *F02M 37/00* | (2006.01) |
| *B60K 15/03* | (2006.01) |

(52) U.S. Cl.
CPC ............. *F02M 37/44* (2019.01); *B60K 15/03* (2013.01); *F02M 37/0011* (2013.01); *F02M 37/04* (2013.01); *B60K 2015/03118* (2013.01); *B60K 2015/03467* (2013.01); *Y10T 137/85978* (2015.04); *Y10T 137/86027* (2015.04)

(58) Field of Classification Search
CPC .. F02M 37/103; F02M 37/44; F02M 37/0011; B60K 15/03; B60K 2015/03118; B60K 2015/03467; Y10T 137/85978; Y10T 137/86027

See application file for complete search history.

(56) References Cited

U.S. PATENT DOCUMENTS

| | | | |
|---|---|---|---|
| 2001/0050107 A1* | 12/2001 | Walker ................. | F02M 37/103 137/565.01 |
| 2003/0102033 A1 | 6/2003 | Dasilva et al. | |
| 2003/0102035 A1 | 6/2003 | Dasilva et al. | |

(Continued)

FOREIGN PATENT DOCUMENTS

JP    2016-205208    12/2016

*Primary Examiner* — Atif H Chaudry
(74) *Attorney, Agent, or Firm* — Nixon & Vanderhye P.C.

(57) ABSTRACT

A fuel pump module includes: a pump unit; a lid provided to close an opening of a fuel tank; and a flexible fuel tube. The pump unit includes a fuel pump configured to pump fuel out of the fuel tank, a housing that holds the fuel pump, and a filter configured to filter the fuel. The lid has a discharge port to supply the fuel to outside of the fuel tank. The flexible fuel tube connects the pump unit and the discharge port. The housing includes a guide portion configured to fix the pump unit to a fixing member having a pair of rails provided in the fuel tank, and a separation regulating member configured to regulate the guide portion from separating from the pair of rails by engaging with the fixing member.

8 Claims, 19 Drawing Sheets

(56) References Cited

U.S. PATENT DOCUMENTS

2008/0295808 A1* 12/2008 Tateishi ............... B01D 35/027
                                                        123/497
2016/0369756 A1* 12/2016 Ikeya ................. F02M 37/0076
2018/0163679 A1*  6/2018 Niwa ..................... F02M 37/50

* cited by examiner

FUEL PUMP MODULE, FUEL SUPPLY DEVICE, AND METHOD OF INSTALLING FUEL PUMP MODULE IN FUEL TANK

CROSS REFERENCE TO RELATED APPLICATION

This application is based on Japanese Patent Application No. 2019-178272 filed on Sep. 30, 2019, the disclosure of which is incorporated herein by reference in its entirety.

TECHNICAL FIELD

The present disclosure relates to a fuel pump module, a fuel supply device, and a method of installing a fuel pump module in a fuel tank.

BACKGROUND

A fuel pump is disposed in a fuel tank to send fuel from the fuel tank to an internal combustion engine.

SUMMARY

According to an aspect of the present disclosure, a fuel pump module includes: a pump unit; a lid provided to close an opening of a fuel tank; and a flexible fuel tube. The pump unit includes a fuel pump configured to pump fuel out of the fuel tank, a housing that holds the fuel pump, and a filter configured to filter the fuel. The lid has a discharge port to supply the fuel to outside of the fuel tank. The flexible fuel tube connects the pump unit and the discharge port. The housing includes a guide portion configured to fix the pump unit to a fixing member having a pair of rails provided in the fuel tank, and a separation regulating member configured to regulate the guide portion from separating from the pair of rails by engaging with the fixing member.

DETAILED DESCRIPTION

A fuel pump is disposed in a fuel tank to send fuel from the fuel tank to an internal combustion engine. The fuel pump is guided by an insertion guide when the fuel pump is installed in the fuel tank.

The fuel tank will be made smaller in response to fuel consumption regulations for automobiles and increase in the number of hybrid vehicles. Further, it is preferable to dispose the fuel pump at substantially the center of the fuel tank considering that the fuel in the fuel tank moves and is biased due to acceleration/deceleration or tilting of the vehicle when the vehicle is driven. However, if the insertion guide is used, as the insertion guide needs the space, it is difficult to install the fuel pump at the vicinity of the center of the fuel tank in the longitudinal direction.

According to an aspect of the present disclosure, a fuel pump module is to be mounted in a fuel tank. The fuel pump module includes a pump unit having a fuel pump configured to pump fuel in the fuel tank, a housing that holds the fuel pump, and a filter configured to filter the fuel. A lid is provided on the fuel tank to close an opening which is an inlet when the pump unit is arranged in the fuel tank. The lid has a discharge port to supply fuel to outside the fuel tank. A flexible fuel tube connects the pump unit to the discharge port. The housing has a guide portion that fixes the pump unit to a fixing member provided in the fuel tank. The fixing member has a pair of rails. The housing has a separation regulating member that restricts the guide portion from being disengaged from the rails by engaging with the fixing member. Accordingly, it is easy to dispose the pump unit near the center of the fuel tank in the longitudinal direction without using the insertion guide.

First Embodiment

Figure 1:
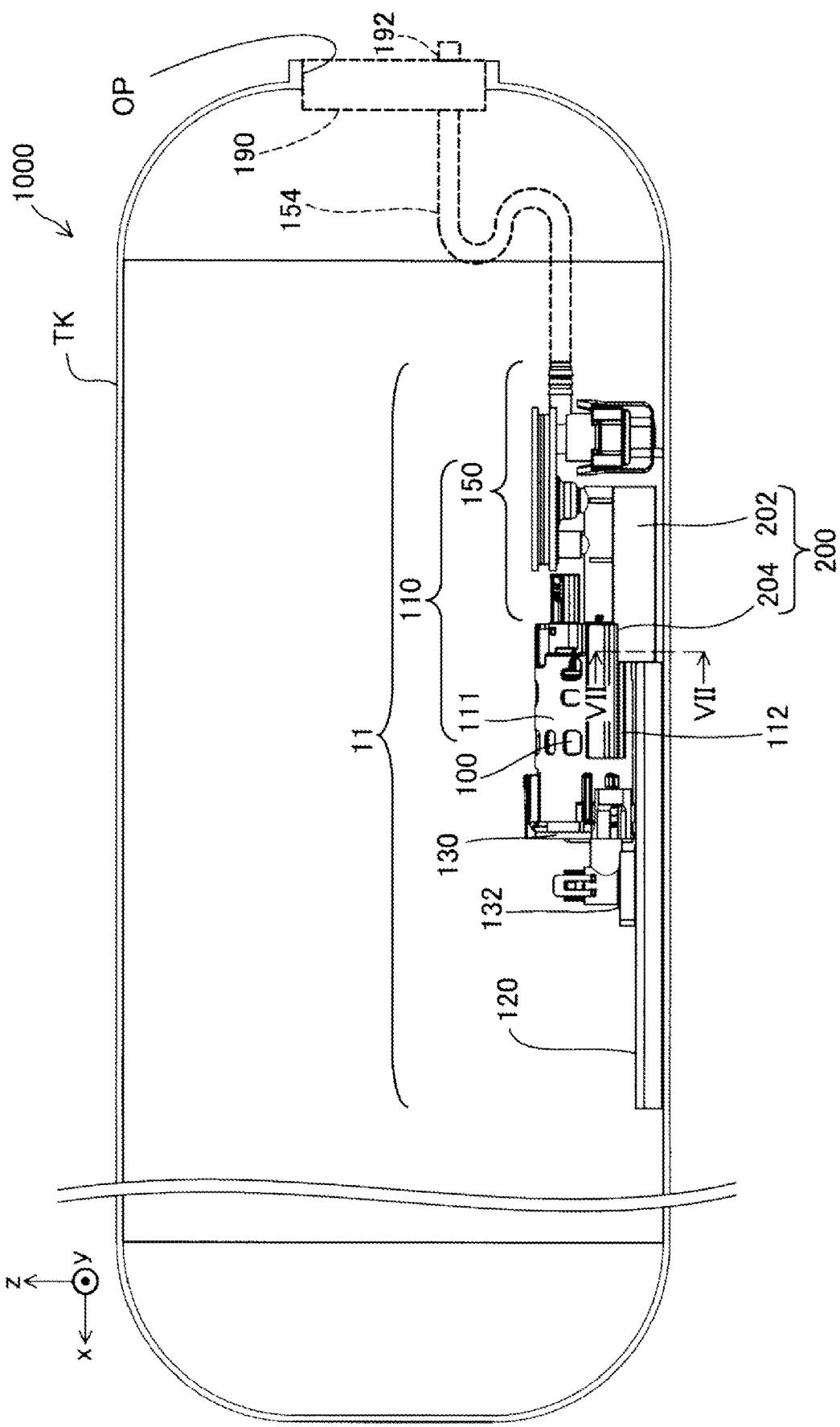
FIG. 1 is an explanatory view illustrating a fuel supply device according to a first embodiment.

FIG. 1 is an explanatory diagram illustrating a fuel supply device 1000. The fuel supply device 1000 includes a pump unit 11, a fixing member 200, and a fuel tank TK. The fixing member 200 is attached to an inner bottom surface of the fuel tank TK. The pump unit 11 is fixed to the fixing member 200. An opening OP of the fuel tank TK is closed by a lid 190. The lid 190 and the pump unit 11 are connected by a flexible fuel tube 154.

The pump unit 11 includes a fuel pump 100, a housing 110, a filter 120, a bracket 130, and a cap 132. The fuel pump 100 pumps out fuel stored in the fuel tank TK and supplies the fuel to the outside. The housing 110 is made of a resin member, and holds the fuel pump 100. The housing 110 includes a pump holding portion 111 that holds the fuel pump 100, and an in-housing flow path 150. The in-housing flow path 150 is connected to the discharge port of the fuel pump 100. The pump unit 11 is inserted into the fuel tank TK by moving in the x direction. The vertical direction is represented by the z direction. A direction intersecting the x direction and the z direction is represented by the y direction. The in-housing flow path 150 is formed to extend in −x direction when viewed from the fuel pump 100.

The filter 120 filters and removes impurities such as foreign substances from the fuel drawn into the fuel pump 100. The suction side of the fuel pump 100 is located away from the opening OP in the +x direction when viewed from the fuel pump 100. The bracket 130 is connected to the suction side of the housing 110. The cap 132 is connected to the bracket 130. The cap 132 is enlarged on the side opposite to the bracket 130, and the enlarged portion is connected to the filter 120.

Figure 2:
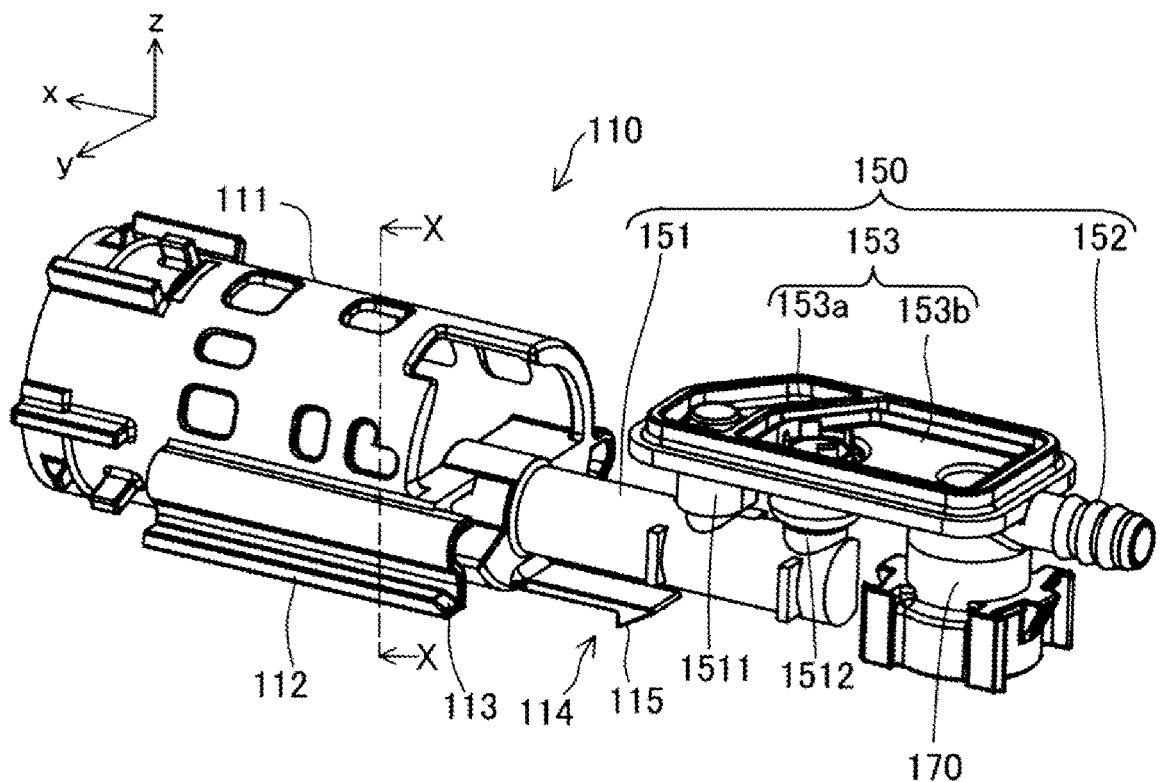
FIG. 2 is a perspective view illustrating a housing of a pump unit of the fuel supply device.
Figure 3:
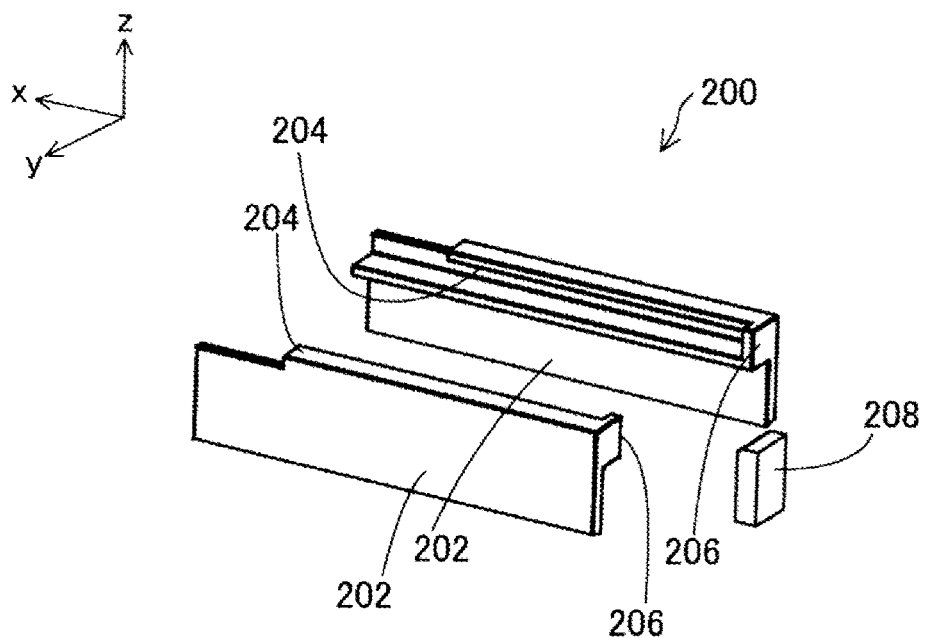
FIG. 3 is a perspective view illustrating a fixing member of the fuel supply device.

FIG. 2 is a perspective view illustrating the housing 110. FIG. 3 is a perspective view of the fixing member 200 that fixes the housing 110 to the fuel tank TK. The housing 110 includes the pump holding portion 111, the in-housing flow path 150, a guide portion 112, and a snap-fit portion 114. The fixing member 200 includes a base portion 202, a rail 204, a stopper 206, and a locking portion 208. In FIG. 3, the locking portion 208 is a separate member separated from the base portion 202. Alternatively, the base portion 202, the rail 204, the stopper 206, and the locking portion 208 may be integrally formed as one-piece member.

The pump holding portion 111 holds the fuel pump 100, and has a substantially tubular shape. The in-housing flow path 150 is formed on the back side (to extend in the −x direction) of the housing 110. The in-housing flow path 150 includes a first passage 151, a second passage 152, an intermediate passage 153, and connection channels 1511 and 1512. The intermediate passage 153 has a first path 153a and a second path 153b. In FIG. 2, a lid of the intermediate passage 153 is removed. The first passage 151 is connected to a discharge port (not shown) of the fuel pump 100. The connection channels 1511 and 1512 are connected to the first passage 151. The connection channel 1511 is connected to the first path 153a, and the connection channel 1512 is connected to the second path 153b. A residual pressure holding valve is provided in the connection channel 1511, 1512 to keep the pressure so that the pressure in the first path 153a and the second path 153b does not drop even if the operation of the fuel pump 100 is stopped. The second passage 152 and the pressure regulating valve 170 are connected to the second path 153b. The pressure regulating valve 170 regulates the pressure of fuel to a specified value when the fuel is delivered from the second path 153b to the fuel tube 154 via the second passage 152. The fuel tube 154 is connected to the second passage 152.

The guide portion 112 is a strip-shaped member formed on both side surfaces of the pump holding portion 111 along the x direction. The guide portion 112 is inserted into the rail 204 of the fixing member 200 fixed to the fuel tank TK. The guide portion 112 has an insertion tip 113 to be inserted into the rail 204, at the end adjacent to the in-housing flow path 150. In the present embodiment, a member formed in the housing 110 is called as "guide portion" and a member formed in the fixing member 200 is called as "rail" regardless of the shapes. The snap-fit portion 114 engages with the locking portion 208 of the fixing member 200 by utilizing the elasticity of resin forming the housing 110. The snap-fit portion 114 is a separation regulating member of the housing 110 configured to restrict the housing 110 from separating from the fixing member 200. The locking portion 208 is a separation regulation member of the fixing member 200. In FIG. 2, the snap-fit portion 114 is provided vertically below the first passage 151, and a clearance is defined between the snap-fit portion 114 and the first passage 151. The snap-fit portion 114 has a nail 115 that protrudes downward in the vertical direction. The nail 115 is located at the tip end of the snap-fit portion 114 in the −x direction. The nail 115 has a wedge shape that is sharply tapered in the −x direction.

The base portion 202 of the fixing member 200 shown in FIG. 3 includes a pair of rails 204 extending along the x direction. The guide portion 112 of the housing 110 is inserted into the rail 204 in the −x direction. The stopper 206 is provided at the end of the rail 204 in the −x direction. The stopper 206 is configured to stop the movement of the guide portion 112 when the guide portion 112 is inserted, so that the guide portion 112 does not go too far in the −x direction. Although the stopper 206 is provided on the pair of rails 204 in FIG. 3, the stopper 206 may be provided on only one of the rails 204.

The locking portion 208 protrudes in the +z direction, and engages with the nail 115 of the housing 110 to lock the housing 110 so as not to return in the +x direction. Specifically, when the housing 110 is fixed to the fixing member 200, the nail 115 of the snap-fit portion 114 is bent vertically upward by the locking portion 208 of the fixing member 200, and thus gets over the locking portion 208 of the fixing member 200. After the nail 115 gets over the locking portion 208, the nail 115 returns to the original state from the state of being bent vertically upward due to elasticity, and engages with the locking portion 208 of the fixing member 200. After that, even if a force is applied to the housing 110 in the +x direction, the nail 115 does not disengage from the locking portion 208. Therefore, when the housing 110 is fixed to the fixing member 200, the housing 110 cannot move in both the +x direction and the −x direction. The nail 115 may have a shape other than the above-described shape. For example, the nail 115 may be convex upward in the vertical direction, or may be convex in the horizontal direction. The protruding direction of the locking portion 208 may be set according to the projection direction of the nail 115. For example, as shown in FIG. 3, the locking portion 208 protrudes in the +z direction, when the nail 115 protrudes in a direction other than upward. When the nail 115 protrudes upward, the locking portion 208 has a key shape bent in the −z direction.

Figure 4:
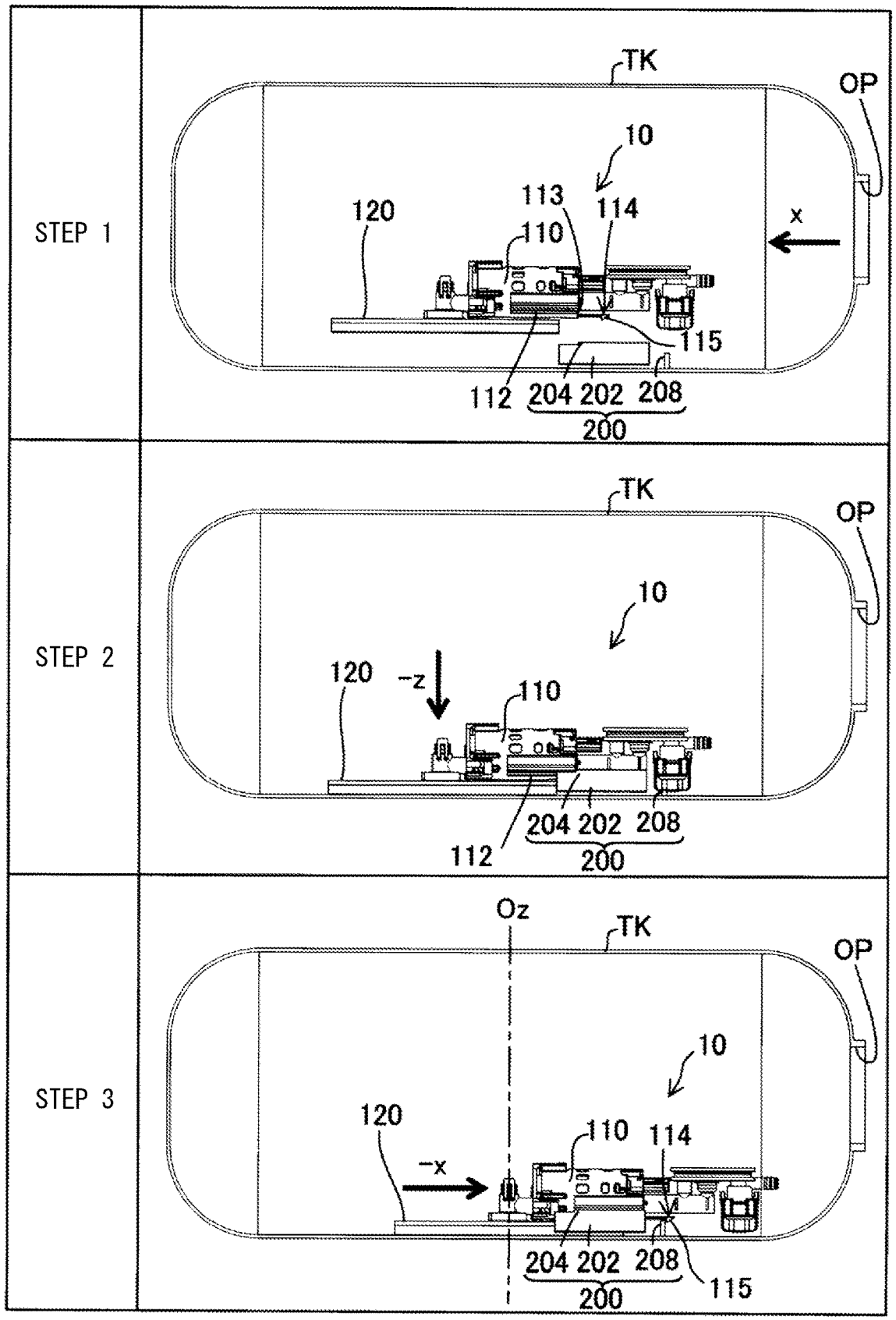
FIG. 4 is an explanatory view illustrating steps for attaching the pump unit to a fuel tank.

FIG. 4 illustrates steps for attaching the fuel pump module 10 to the fuel tank TK. In FIG. 4, illustration of the fuel tube 154 and the lid 190 is omitted, and only a part of the fuel pump module 10 is shown. In step 1, a disposing device (not shown) holds the left side and the right side of the housing 110, for example, using an arm, and inserts the fuel pump module 10 through the opening OP. At this time, the disposing device inserts the housing 110 of the fuel pump module 10 deeply into the fuel tank TK (in the +x direction) until the insertion tip 113 of the guide portion 112 of the housing 110 is located on the +x side with respect to the rail 204 of the fixing member 200.

In step 2, the disposing device moves the housing 110 of the fuel pump module 10 vertically downward (in the −z direction). As a result, the filter 120 contacts the inner wall of the fuel tank TK.

In step 3, the disposing device inserts the guide portion 112 into the rail 204 while moving the housing 110 in the −x direction. At this time, the filter 120 is inserted between the base portions 202 of the fixing member 200. After the nail 115 has passed over the locking portion 208 and engaged with the locking portion 208, the insertion tip 113 of the guide portion 112 abuts on the stopper 206. The engagement between the nail 115 and the locking portion 208 suppresses the movement of the housing 110 in the +x direction. The stopper 206 suppresses the movement of the housing 110 in the −x direction. As a result, the housing 110 of the fuel pump module 10 is securely fixed to the fixing member 200. The center Oz of the fuel tank TK in the longitudinal direction coincides with the center of the filter 120 of the fuel pump module 10.

Figure 5:
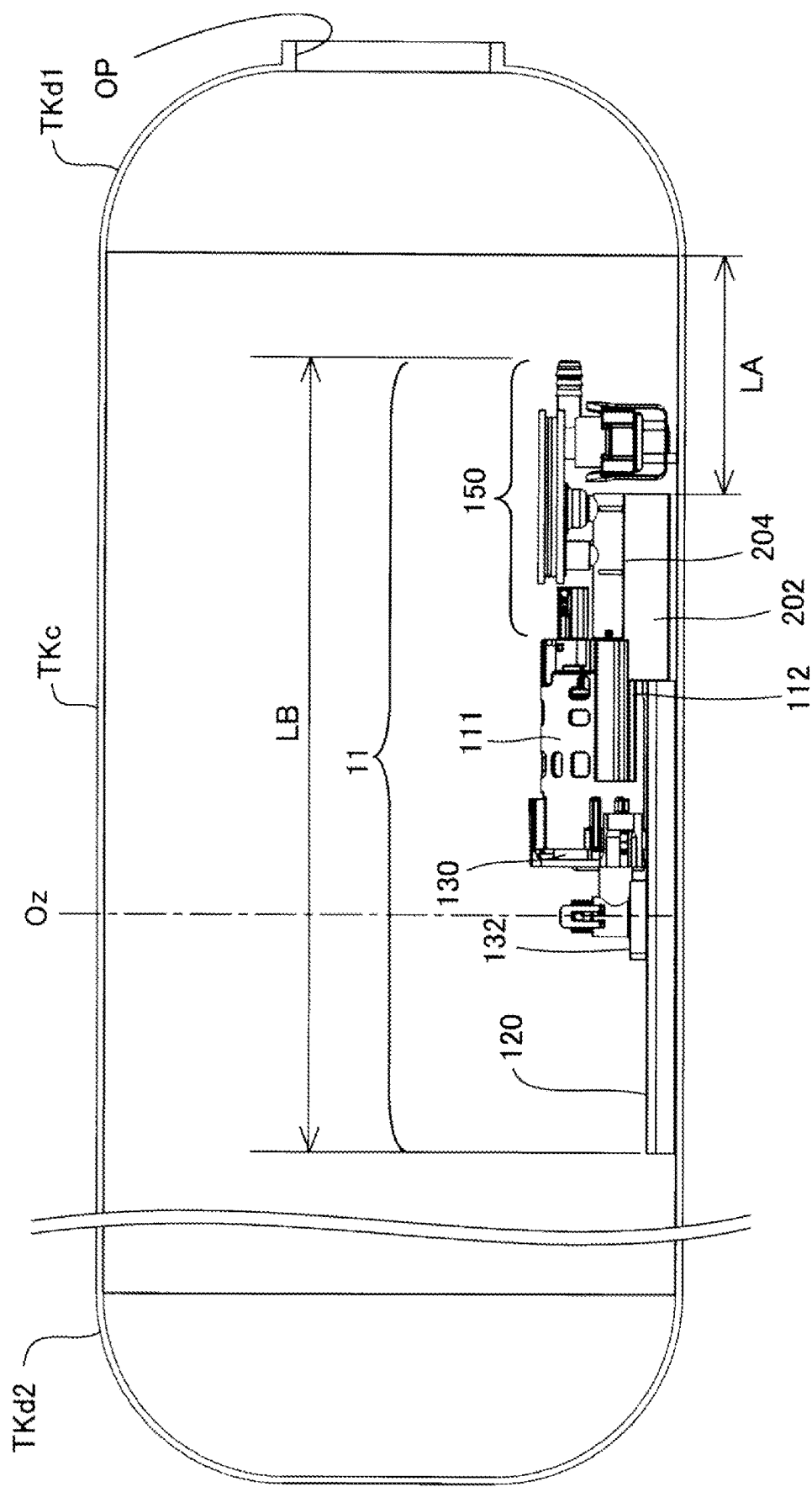
FIG. 5 is an explanatory view illustrating a positional relationship between the fuel tank and the pump unit.

FIG. 5 illustrates the position of the pump unit 11 in the fuel tank TK. The fuel tank TK includes a cylindrical portion TKc and dome portions TKd1 and TKd2. The cylindrical portion TKc is a central portion of the fuel tank TK in the longitudinal direction (in the x direction). The cylindrical portion TKc has a substantially cylindrical shape, and has a flat bottom surface. The dome portions TKd1 and TKd2 are arranged on respective sides of the cylindrical portion TKc. Each of the dome portions TKd1 and TKd2 has a substantially dome shape. The opening OP is formed in the dome portion TKd1. A length from the end of the rail 204 facing the dome portion TKd1 to a boundary between the cylindrical portion TKc and the dome portion TKd1 is defined as LA. A length of the pump unit 11 in the longitudinal direction of the fuel tank TK (in the x direction) is defined as LB. When the pump unit 11 is arranged at the center of the fuel tank TK in the x direction, LA<LB is satisfied. The fixing member 200 is arranged in the fuel tank TK at a position satisfying LA<LB.

As shown in FIG. 5, the filter 120 is in contact with the bottom surface of the fuel tank TK, and the center of the filter 120 in the longitudinal direction coincides with the center Oz of the fuel tank TK in the longitudinal direction. That is, the filter 120 is located near the center of the fuel tank TK in the longitudinal direction. When a vehicle equipped with the fuel tank TK leans at a slope or a curve, the fuel may be biased inside the fuel tank TK. In case where the fuel is biased in the fuel tank TK, when the filter 120 is located near the center of the fuel tank TK in the longitudinal direction, the fuel is more likely to contact the filter 120, compared with a case where the filter 120 is located at another position. The fuel can be easily sucked up in the present embodiment.

Figure 6:
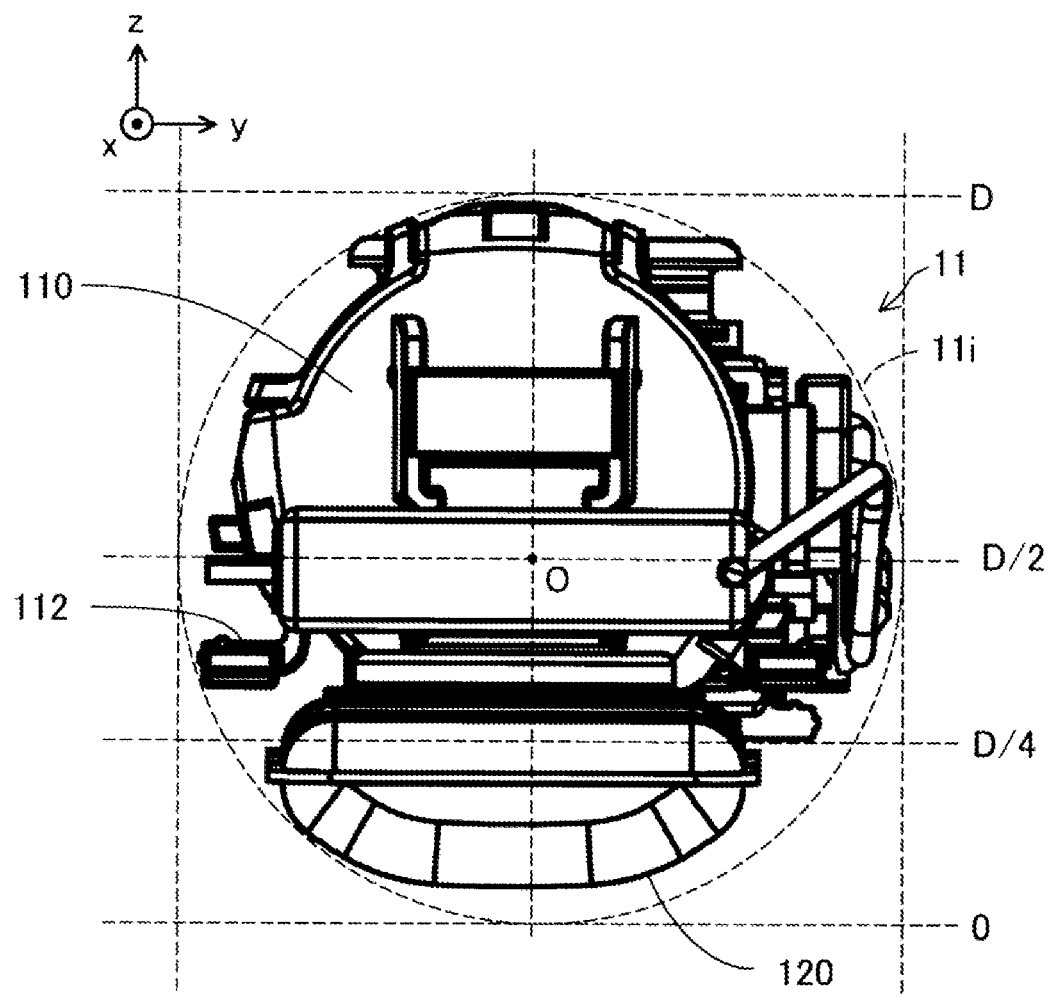
FIG. 6 is a front view of the pump unit.

FIG. 6 is a view illustrating the pump unit 11 as seen from the +x direction. When the pump unit 11 is viewed from the +x direction, a minimum inscribed circle 11$i$ is defined to be in contact with the pump unit 11, and has a diameter D. The position of the guide portion 112 in the z direction is within a range from the center O of the minimum inscribed circle 11$i$ to ¼ of the height of the minimum inscribed circle 11$i$. That is, the guide portion 112 is formed within a range from D/4 to D/2 in the z direction. When the guide portion 112 is formed to be located within the range of D/4 to D/2 in the z-direction, the minimum inscribed circle 11$i$ can be made small and the guide portion 112 can be easily housed within the minimum inscribed circle 11$i$. Therefore, the size of the pump unit 11 in the radial direction can be reduced. If the radial size of the pump unit 11 can be reduced, the pump unit 11 can easily pass through the opening OP of the fuel tank TK.

Figure 7:
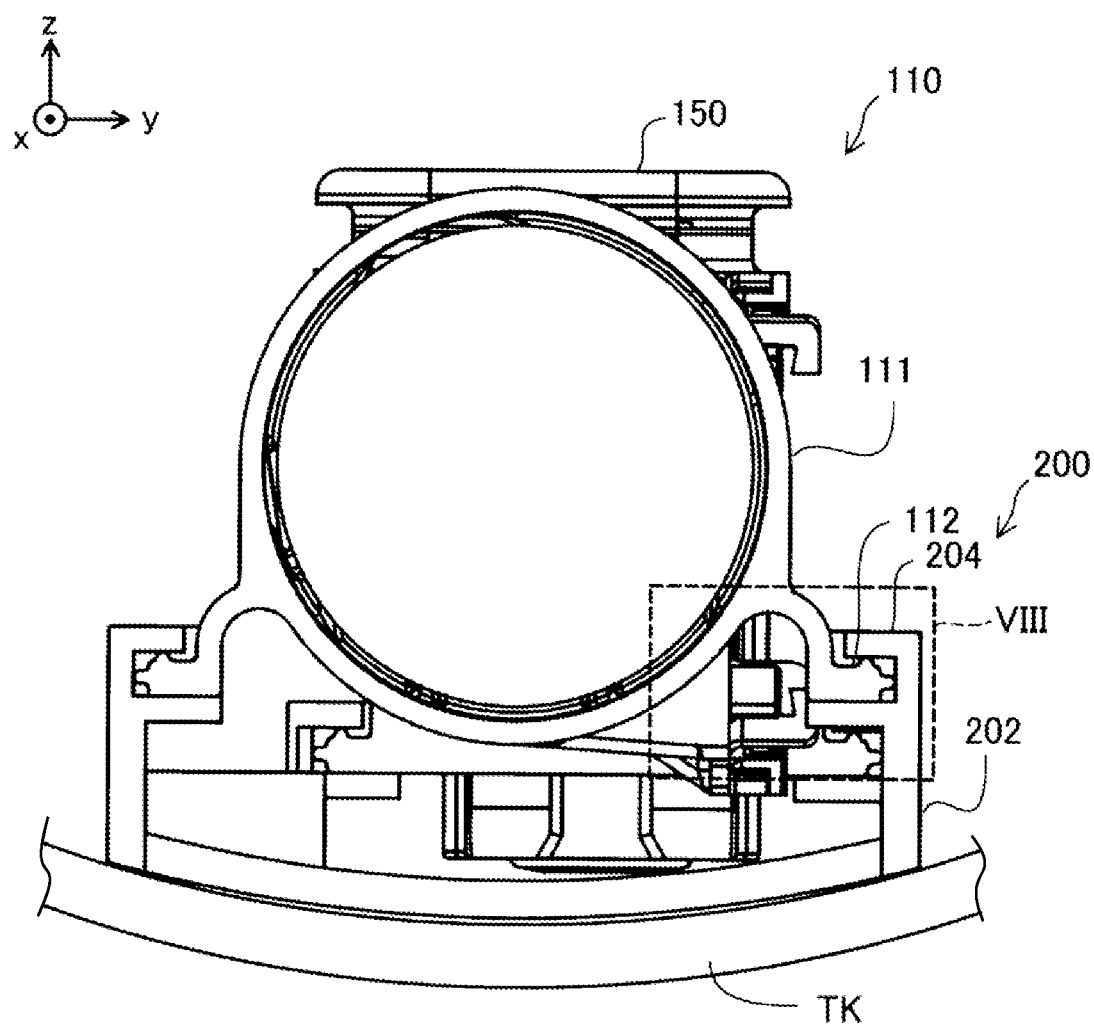
FIG. 7 is a view taken along a plane corresponding to a line VII-VII in FIG.
Figure 8:
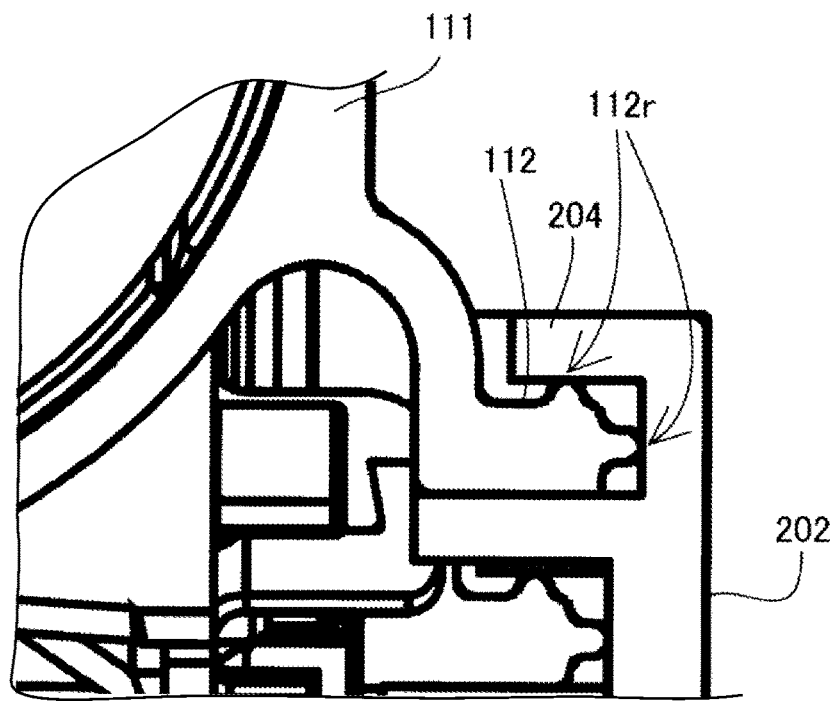
FIG. 8 is an enlarged view of an area VIII in FIG. 7, illustrating a fitting between a guide portion and a rail.

FIG. 7 illustrates the housing 110 and the fixing member 200 taken along the yz plane passing through the guide portion 112. FIG. 8 is an explanatory drawing in which the guide portion 112 and the rail 204 are enlarged in the area VIII of FIG. 7. The rail 204 holds the guide portion 112 from three sides, e.g., upper side, lower side and lateral side. The guide portion 112 has protrusions 112$r$ on the upper side and the lateral side. The protrusions 112$r$ are in contact with the rail 204. The protrusion 112$r$ supports the guide portion 112 so as not to rattle in the rail 204. When the guide portion 112 has the protrusion 112$r$, the contact area between the guide portion 112 and the rail 204 is made small. As a result, the load of inserting the guide portion 112 into the rail 204 is reduced. The protrusion 112$r$ may be provided on the rail 204, instead of the guide portion 112.

Figure 9:
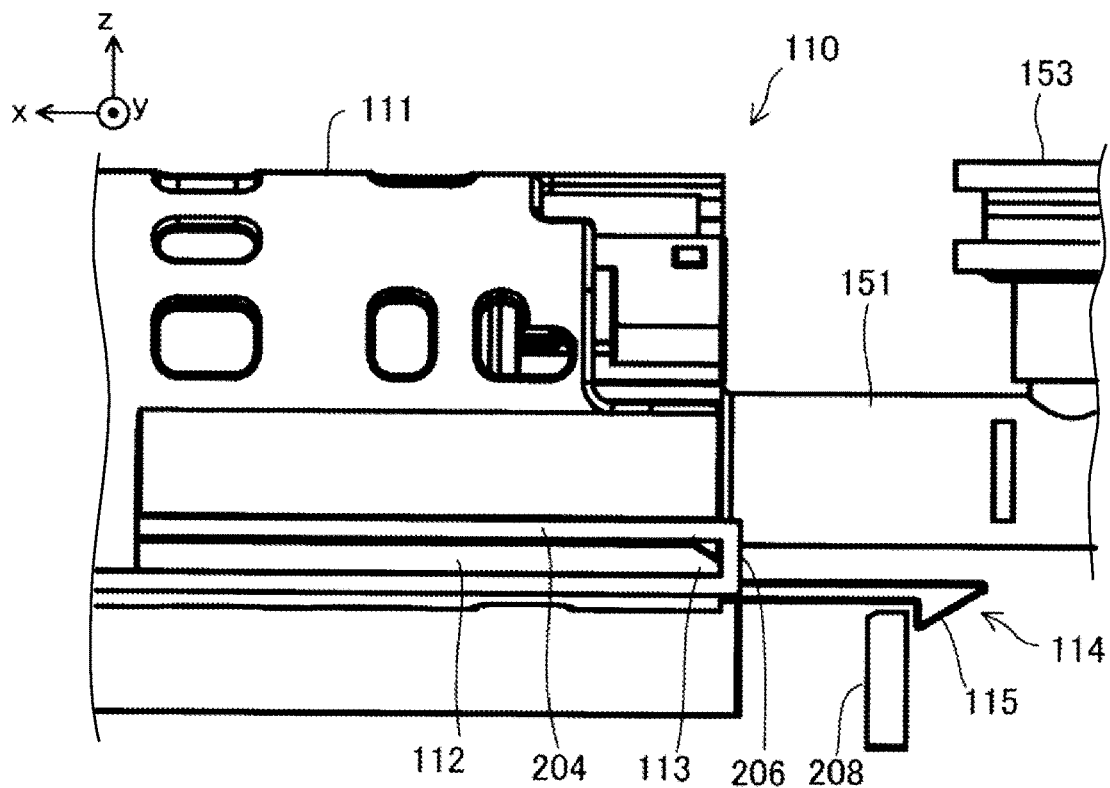
FIG. 9 is a side view illustrating a fitting among the guide portion, the rail and a snap-fit portion.

In this embodiment, as shown in FIG. 9, the housing 110 includes the guide portion 112 and the snap-fit portion 114 separately. The fixing member 200 includes the stopper 206 and the locking portion 208 separately. Since the snap-fit portion 114 is not sandwiched by the rails 204, it is not necessary to provide a space between the rails 204 for elastically deforming the snap-fit portion 114. Further, the load for inserting the guide portion 112 into the rail 204 can be kept low due to only the friction between the guide portion 112 and the rail 204. Further, the flexibility in designing the guide portion 112, the snap-fit portion 114, the rail 204, and the stopper 206 can be increased.

Figure 10:
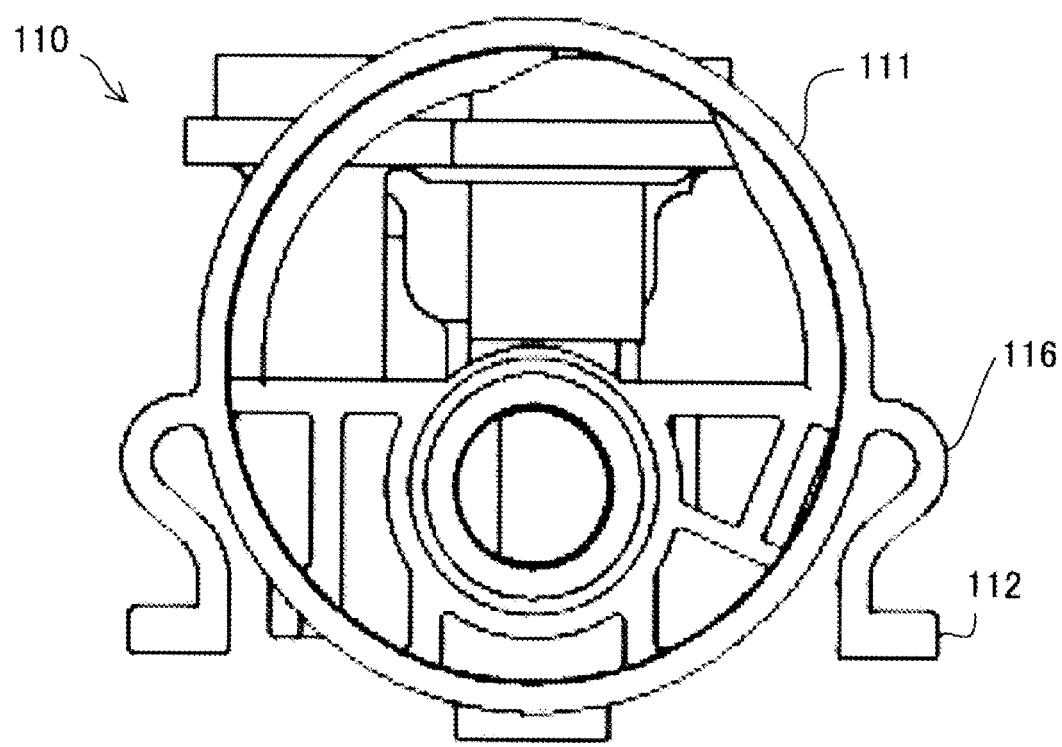
FIG. 10 is an explanatory view illustrating a connecting portion that connects a pump holding portion and the guide portion.

FIG. 10 illustrates a sectional view taken along a line X-X in FIG. 2. As shown in FIG. 10, the pump holding portion 111 and the guide portion 112 of the housing 110 are connected by a curved connecting portion 116. Due to the curved shape, the connecting portion 116 absorbs vibration when the fuel pump 100 operates, and suppresses the transmission of the vibration to the guide portion 112, the fixing member 200, and the fuel tank TK. Note that the connecting portion 116 may not have the curved shape.

According to the first embodiment, the housing 110 has the guide portion 112, and the fixing member 200 fixed to the fuel tank TK has the rail 204. The insertion tip 113 that is an end of the guide portion 112 is firstly inserted into the rail 204. The insertion tip 113 is located adjacent to the in-housing flow path 150, that is, to face the opening OP of the fuel tank TK. Therefore, as shown in step 3 of FIG. 4, when the housing 110 is moved toward the opening OP of the fuel tank TK, the housing 110 is installed adjacent to the opening OP of the fuel tank TK, and the filter 120 can be placed near the center of the fuel tank TK. As a result, even if the fuel in the fuel tank TK becomes uneven, the fuel pump module 10 can suck the fuel. Further, the pump unit 11 is easily fixed by the engagement of the snap-fit portion of the housing 110 and the locking portion 208 of the fixing member 200. The pump unit 11 is restricted from being detached in a normal use state. Further, according to the present embodiment, an insertion guide for guiding the pump unit 11 into the fuel tank TK becomes unnecessary.

Modification of First Embodiment

Figure 11:
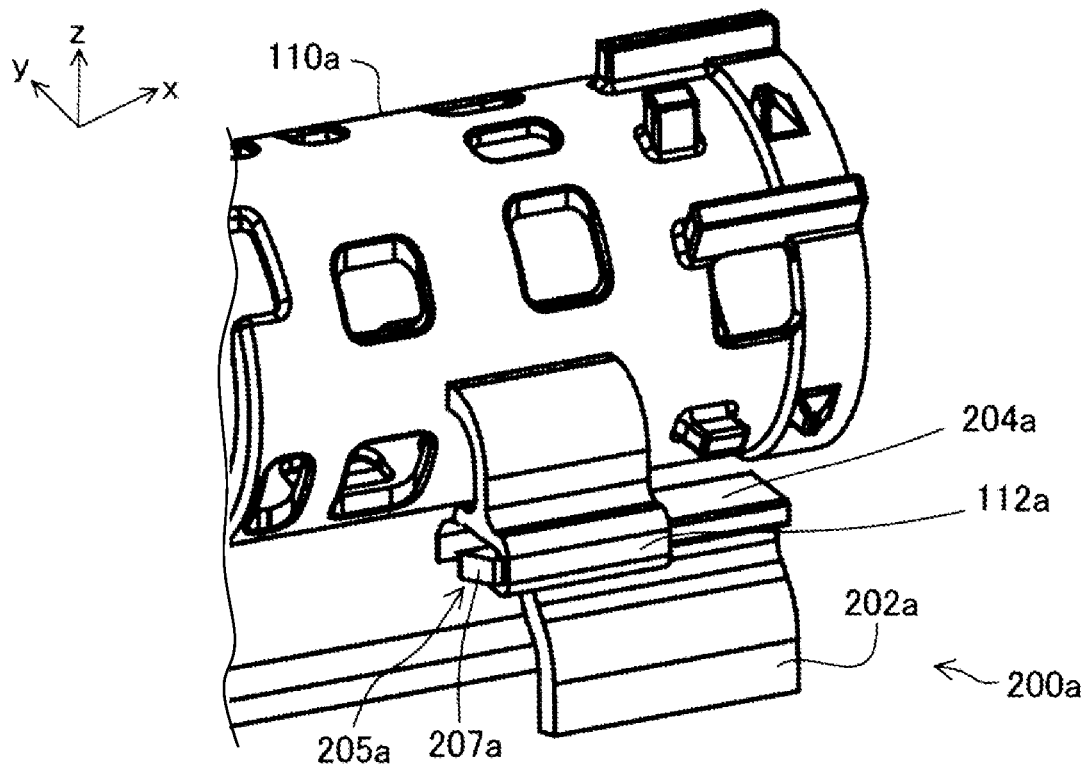
FIG. 11 is an explanatory view illustrating a fitting between a guide portion of a fixing member and a rail of a housing.
Figure 12:
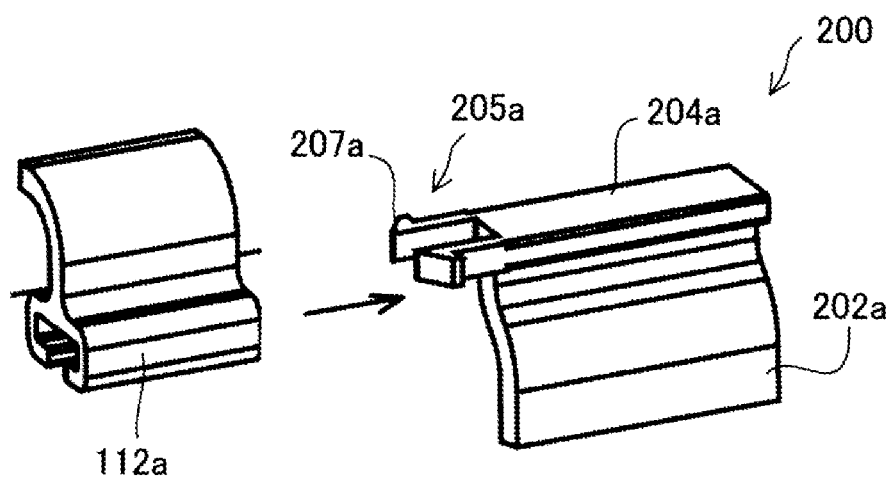
FIG. 12 is an exploded and enlarged view of the rail and the guide portion in FIG. 11.

A modification of the first embodiment is shown in FIGS. 11 and 12, in which the rail 204$a$ of the fixing member 200$a$ is inserted into the guide portion 112$a$ of the housing 110$a$. The fixing member 200$a$ includes the base portion 202$a$, the rail 204$a$, the snap-fit portion 205$a$, and the nail 207$a$. The housing 110$a$ includes the guide portion 112$a$. In this way, one of the guide portion of the housing and the rail of the fixing member is inserted into the other. In FIGS. 11 and 12, a pair of snap-fit portions 205a is provided at the end of the rail 204a, and the snap-fit portion 205a has the nail 207a. When the pair of snap-fit portions 205a is inserted into the guide portion 112a, the pair of snap-fit portions 205a is elastically deformed so that the distance between the pair of snap-fit portions 205a is narrowed. After the pair of snap-fit portions 205a passes through the guide portion 112a, the nail 207a engages with the guide portion 112a. In this case, the guide portion 112a also serves as a separation regulating member of the housing 110a. With this configuration, the housing 110a and the fixing member 200a can be fixed. Further, it is not necessary to form the rail 204a, the snap-fit portion 205a, and the nail 207a as separate parts. In FIGS. 11 and 12, an interval between the pair of snap-fit portions 205a is reduced in the y direction due to elastic deformation at the time of insertion. Alternatively, the snap-fit portion 205a and the nail 207a may be configured so that the interval between the pair of snap-fit portions 205a is reduced in the z direction. Alternatively, the end of the rail 204a may have only one snap-fit portion 205a and one nail 207a.

As shown in the first embodiment and its modification, either of the guide portion and the rail may be inserted to the rest. Further, the snap-fit portion may be formed integrally with the guide portion or the rail, or may be formed separately from the guide portion or the rail.

Second Embodiment

Figure 13:
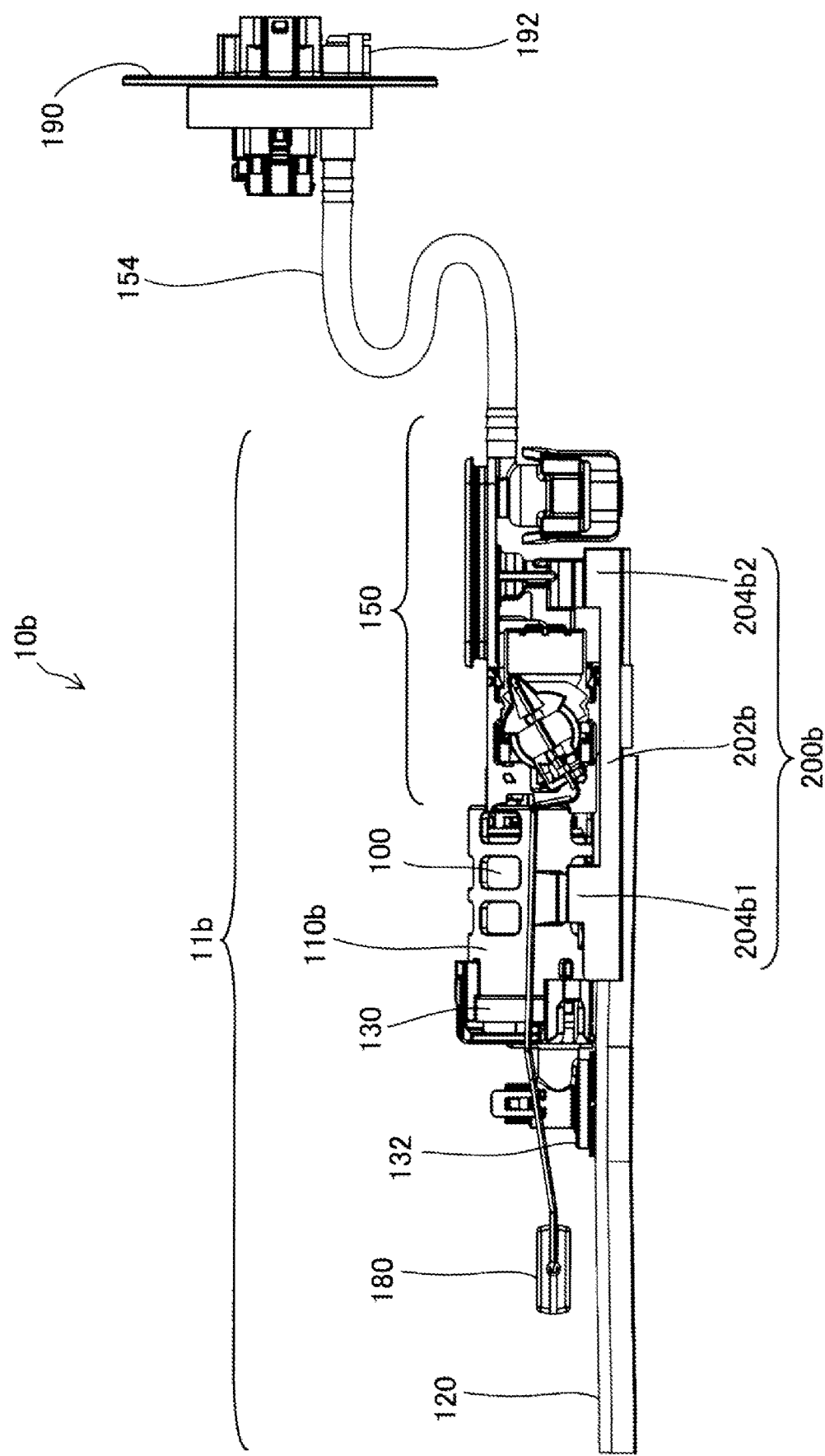
FIG. 13 is an explanatory view illustrating a fuel pump module according to a second embodiment.

FIG. 13 illustrates a fuel pump module 10b according to a second embodiment. The fuel pump module 10b includes two guide portions 112b1, 112b2 arranged in the zx direction and two rails 204b1 and 204b2 arranged in the zx direction. In other words, the guide portion and the rail are fitted at two places, while one guide portion and one rail are fitted only at one place in the x direction in the fuel pump module 10 of the first embodiment. The fuel pump module 10b includes a pump unit 11b, a fuel tube 154, and a lid 190. The lid 190 includes a discharge port 192. The pump unit 11b includes the fuel pump 100, a housing 110b, the filter 120, the bracket 130, the cap 132, and a float 180. The fuel pump module 10b has the same configuration as that of the fuel pump module 10 of the first embodiment except for the shapes of the housing 110b and the fixing member 200b, so that the same reference numerals are used as those used in the first embodiment, and the detailed description is omitted.

Figure 14:
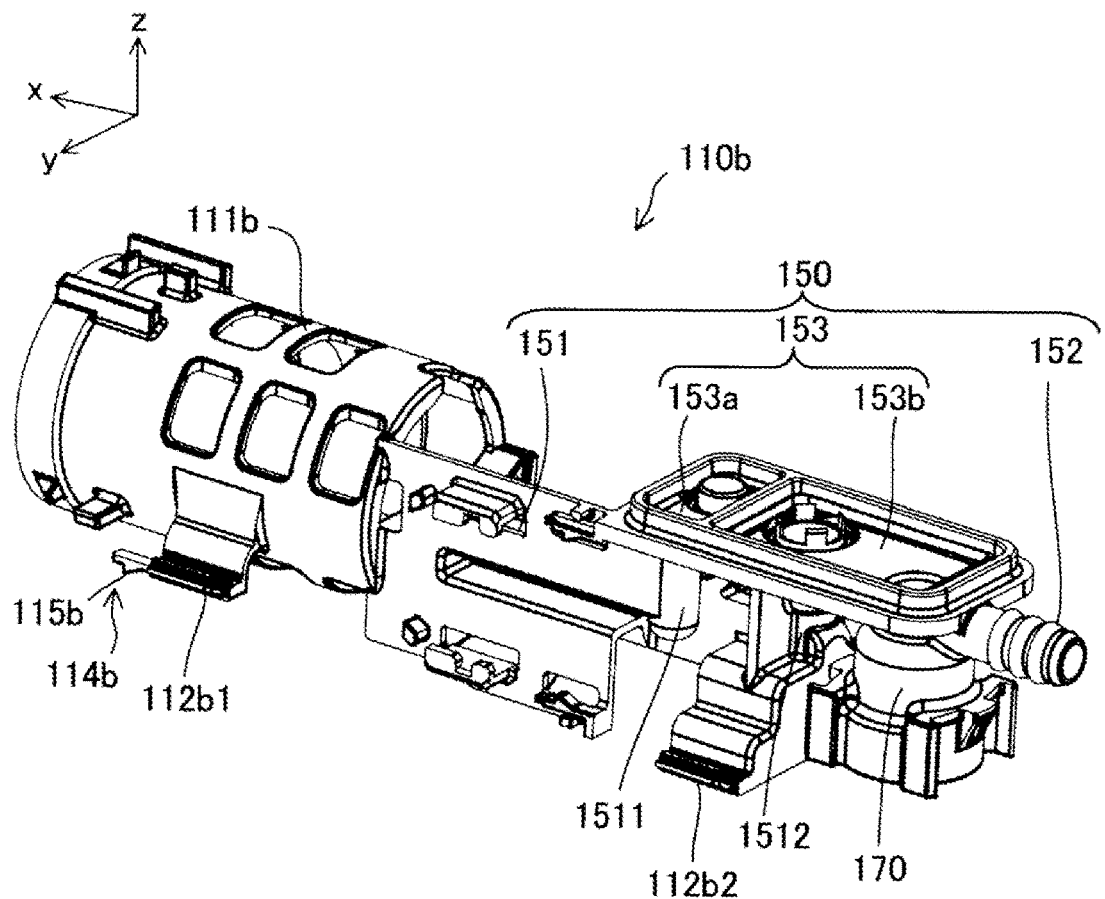
FIG. 14 is a perspective view illustrating a housing of the fuel pump module according to the second embodiment.

FIG. 14 illustrates the housing 110b of the fuel pump module 10b of the second embodiment. Hereinafter, differences from the housing 110 of the first embodiment will be described. The housing 110b includes the two guide portions 112b1 and 112b2. Of the two guide portions 112b1 and 112b2, the guide portion 112b1 is formed on the side surface of the pump holding portion 111b, and the guide portion 112b2 is formed on the side surface of the second connection channel 1512. A snap-fit portion 114b is provided at an end of the guide portion 112b1 in the x direction. A nail 115b protrudes in the −z direction, and is located slightly on the −x side of the end of the snap-fit portion 114b in the x direction. The surface of the nail 115b in the −x direction is inclined with respect to the xy plane, whereas the surface of the nail 115b in the +x direction is perpendicular to the xy plane.

Figure 15:
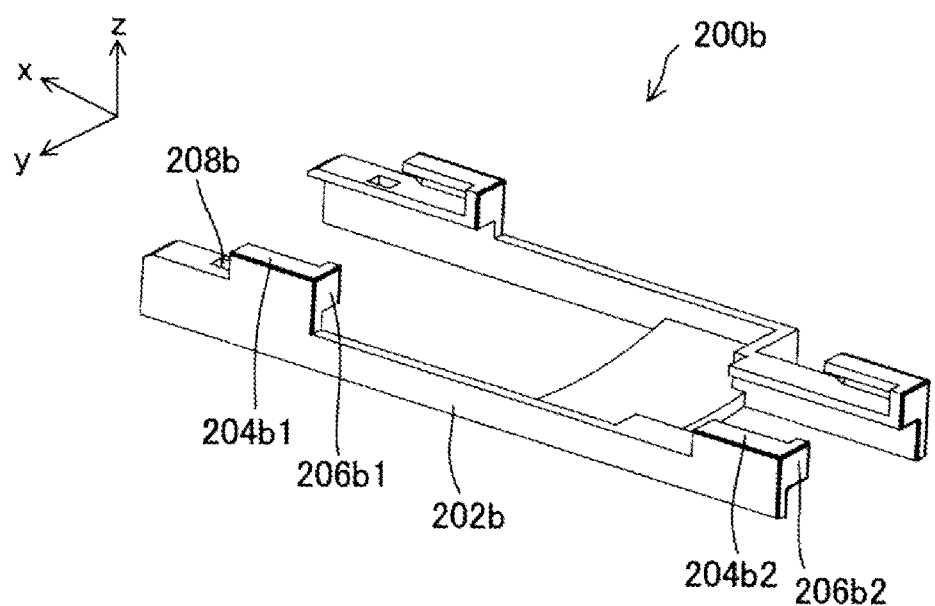
FIG. 15 is a perspective view illustrating a fixing member of the fuel pump module according to the second embodiment.
Figure 16:
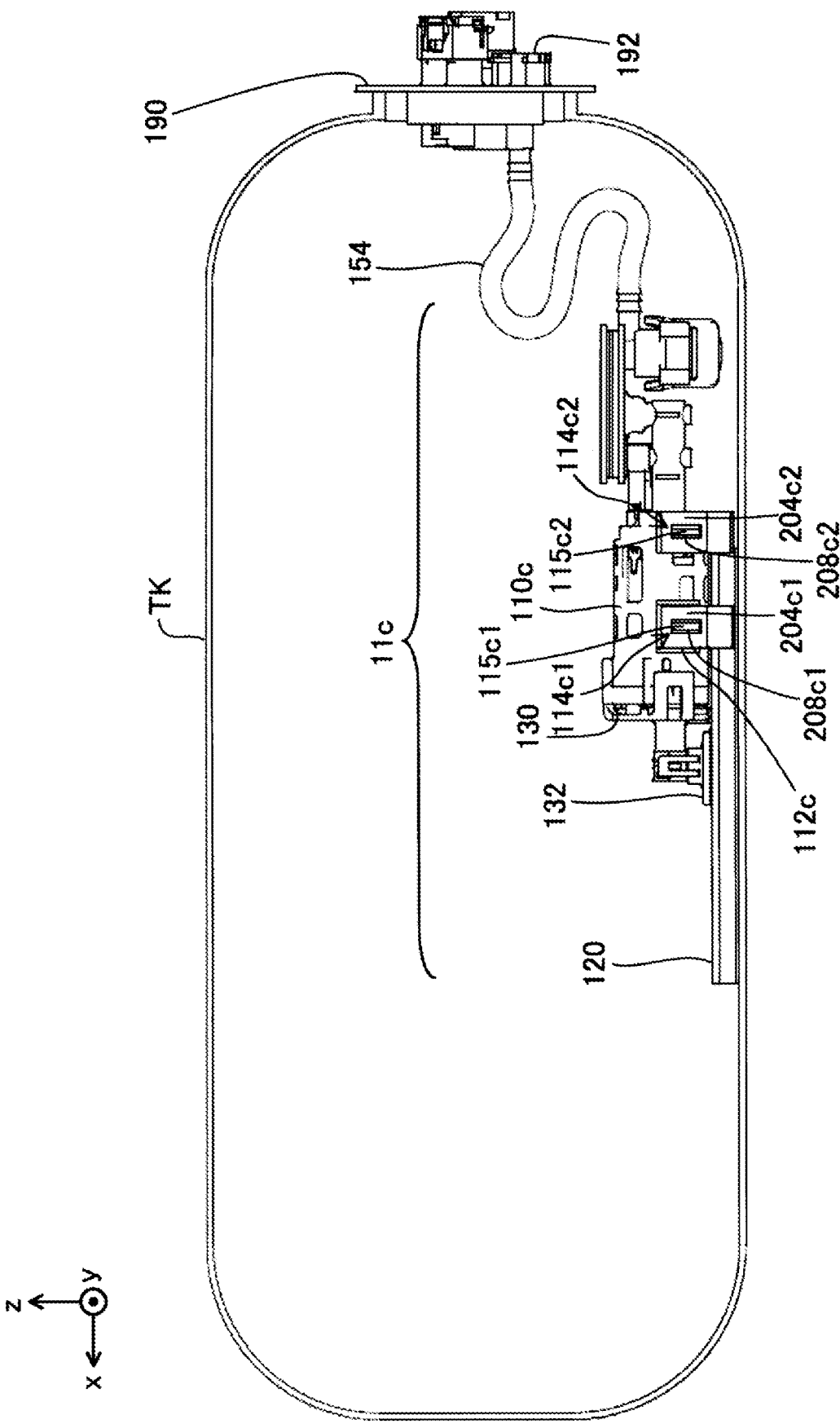
FIG. 16 is an explanatory view illustrating a fuel pump module according to a third embodiment.
Figure 17:
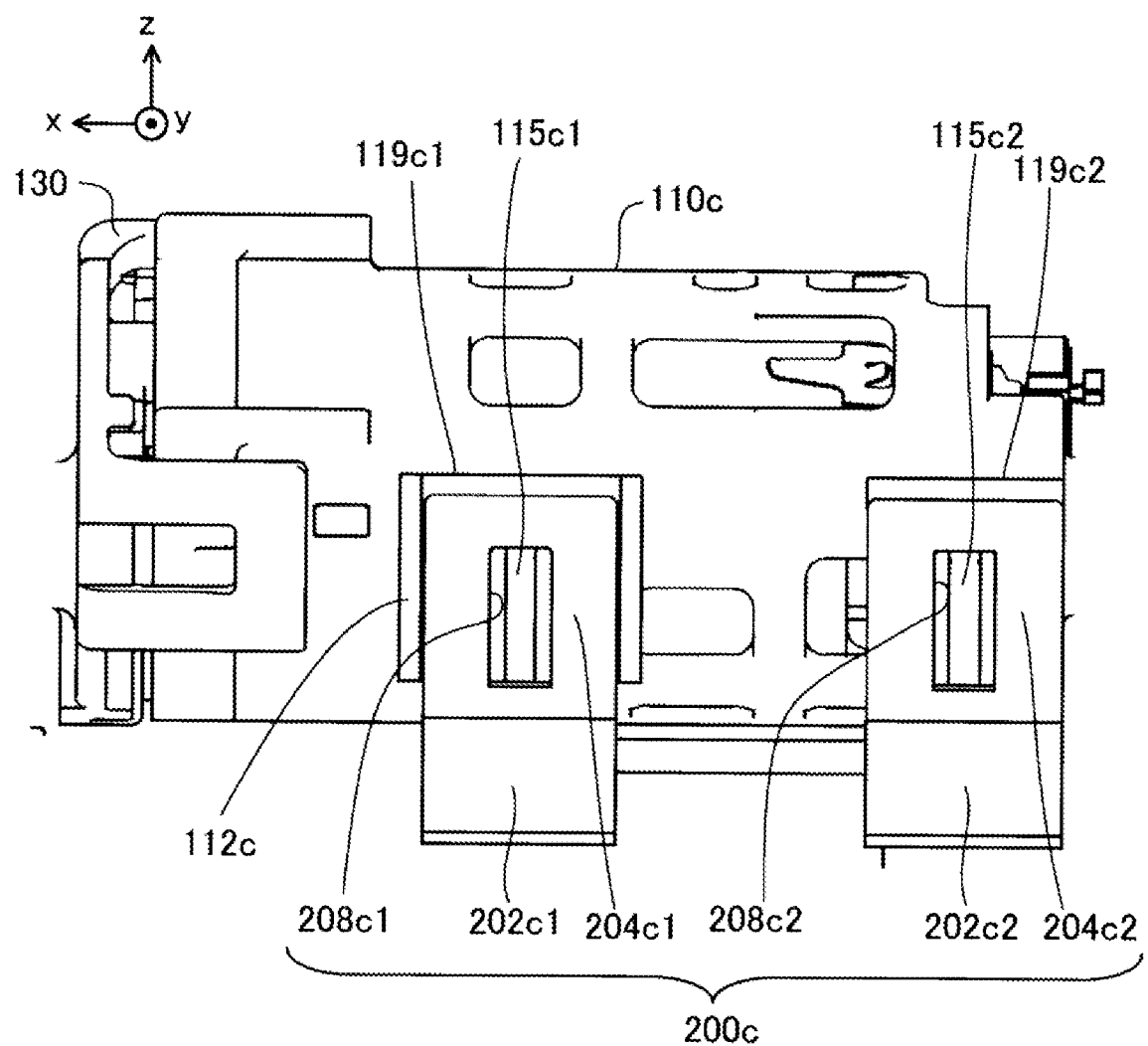
FIG. 17 is a side view illustrating a snap-fit portion of the fuel pump module according to the third embodiment.
Figure 18:
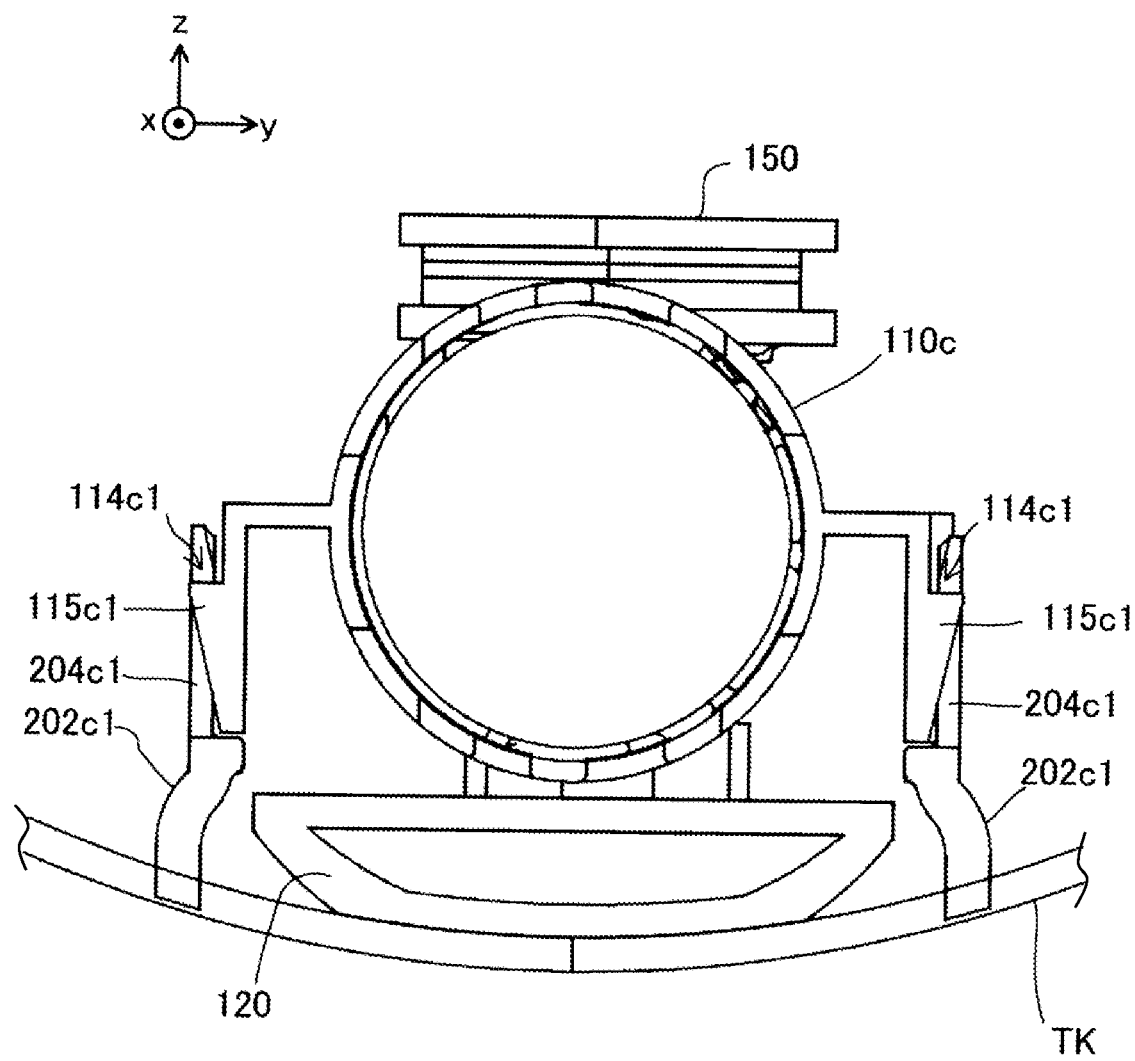
FIG. 18 is a side view illustrating the snap-fit portion of the fuel pump module according to the third embodiment.
Figure 19:
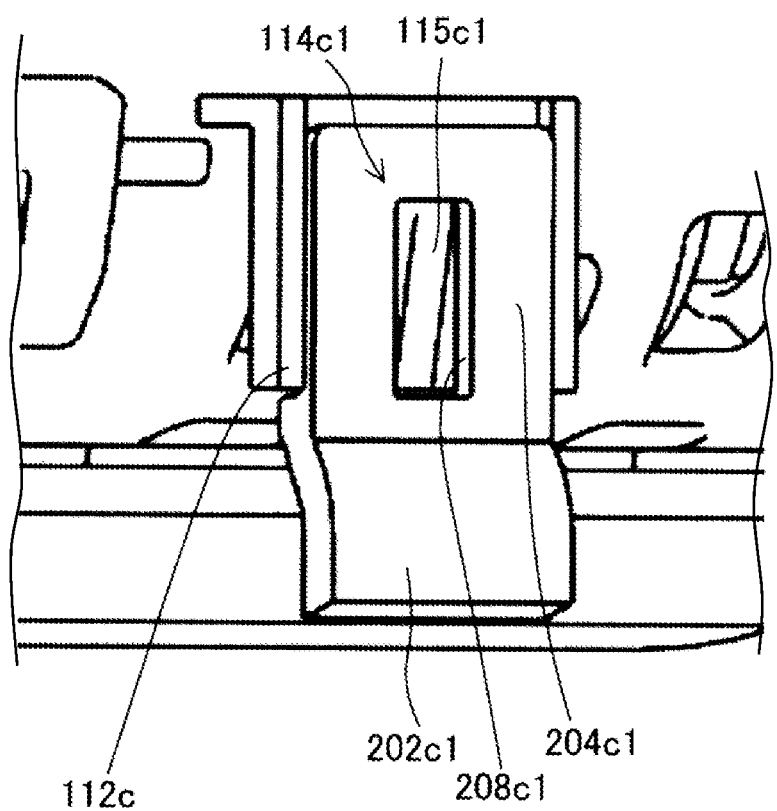
FIG. 19 is an enlarged view illustrating the snap-fit portion according to the third embodiment.

FIG. 15 illustrates the fixing member 200b of the fuel pump module 10b of the second embodiment. The fixing member 200b includes a base portion 202b, rails 204b1 and 204b2, stoppers 206b1 and 206b2, and a locking portion 208b. The guide portions 112b1 and 112b2 are inserted into the rails 204b1 and 204b2, respectively. The guide portions 112b1 and 112b2 abut the stoppers 206b1 and 206b2 respectively to stop the movement of the housing 110b so that the housing 110b does not go too far in the −x direction. One of the stoppers 206b1 and 206b2 can be omitted. The locking portion 208b has a hole opened in the z direction. When the nail 115b moves in the −x direction, the snap-fit portion 114b is distorted in the +z direction by the −x side slope of the nail 115b. When the nail 115b reaches the locking portion 208b, the snap-fit portion 114b is restored to the original state due to the elasticity. Thus, the nail 115b is fitted into the locking portion 208b. Once the nail 115b is fitted into the locking portion 208b, since the surface of the nail 115b in the +x direction is perpendicular to the xy plane, the snap-fit portion 114b cannot warp in the z direction while moving in the +x direction. Therefore, the nail 115b1 cannot be disengaged from the locking portion 208b. As a result, the housing 110b cannot be separated from the fixing member 200b.

According to the second embodiment, as in the first embodiment, the pump unit can be installed in the fuel tank TK without using the insertion guide. Further, the installation position of the pump unit can be set substantially at the center of the fuel tank TK in the longitudinal direction.

According to the second embodiment, the guide portion 112b1 of the housing 110b and the rail 204b1 of the fixing member 200b are fitted together, and the guide portion 112b2 of the housing 110b and the rail 204b2 of the fixing member 200b are fitted together. Since the housing 110b and the fixing member 200b are fitted to each other at two locations, the housing 110b can be more firmly fixed and the vibration of the pump unit 11b can be easily suppressed. The guide portion 112b of the housing 110b is provided at a position corresponding to the side surface of the pump holding portion 111b, that is, the side surface of the fuel pump 100. Therefore, it is easy to suppress vibration caused by the operation of the fuel pump 100.

Third Embodiment

In the first and second embodiments, the pump unit and the fixing member are fixed by moving the pump unit toward the opening OP as described in step 3 of FIG. 4. In a fuel pump module 10c of the third embodiment shown in FIGS. 16 to 19, the pump unit 11c and the fixing member 200c are fixed to each other when the pump unit 11c is moved in the −z direction in step 2 of FIG. 4.

The housing 110c includes a guide portion 112c, snap-fit portions 114c1 and 114c2, protrusions 115c1 and 115c2, and a stopper 119c. The fixing member 200c includes base portions 202c1 and 202c2, rails 204c1 and 204c2, and locking portions 208c1 and 208c2.

The guide portion 112c of the housing 110c and the rails 204c1 and 204c2 of the fixing member 200c are shaped to extend in the z direction. The snap-fit portion 114c1 is provided substantially at the center of the guide portion 112c. The snap-fit portion 114c1 is provided to have a shape extended in the z direction. The snap-fit portion 114c2 is provided in parallel with the snap-fit portion 114c1. However, no guide portion is formed around the snap-fit portion 114c2, because a guiding can be sufficiently performed by the one guide portion 112c. A guide portion may be provided around the snap-fit portion 114c2 to guide with the rail 204c2 in addition to the guide portion 112c.

The snap-fit portion 114c1 has a protrusion 115c1 at the tip end, and the snap-fit portion 114c2 has a protrusion 115c2 at the tip end. The protrusion 115c1, 115c2 is wedge-shaped in which the lower side is made narrower in the vertical direction. The outer surface of the protrusion 115c1, 115c2 is inclined with respect to the xz plane, and the upper surface of the protrusion 115c1, 115c2 is substantially parallel to the xy plane. The stopper 119c1, 119c2 is provided to extend along the x direction at a position slightly upper than the snap-fit portion 114c1, 114c2 in the +z direction. The stopper 119c1, 119c2 is in contact with the rail 204c1, 204c2 to suppress the movement of the housing 110c so that the housing 110c does not go too far in the −z direction.

The locking portion 208c1, 208c2 is formed at substantially the center of the rail 204c1, 204c2 of the fixing member 200c. In this embodiment, the locking portion 208c1, 208c2 is formed as elongated hole longer in the z direction.

When the housing 110c is installed on the fixing member 200c, the protrusion 115c1, 115c2 of the snap-fit portion 114c1, 114c2 is pushed by the rail 204c1, 204c2 from the outer side to the inner side so as to be elastically deformed inward. After that, when the protrusion 115c1, 115c2 comes to the position of the locking portion 208c1, 208c2, the protrusion 115c1, 115c2 is not pushed by the rail 204c1, 204c2, so that the snap-fit portion 114c1, 114c2 returns to the original state by the elasticity. At this time, the protrusion 115c1, 115c2 engages with the locking portion 208c1, 208c2. Since the upper surface of the protrusion 115c1, 115c2 is substantially parallel to the xy plane, the snap-fit portion 114c1, 114c2 cannot be elastically deformed inward even when the housing 110c is moved in the +z direction. Therefore, the protrusion 115c1, 115c2 cannot be disengaged from the locking portion 208c1, 208c2. In this way, when the protrusion 115c1, 115c2 of the snap-fit portion 114c1, 114c2 engages with the locking portion 208c1, 208c2, the housing 110c is fixed to the fixing member 200c. Then, the housing 110c cannot be separated from the fixing member 200c.

According to the third embodiment, the pump unit 11c can be installed in the fuel tank TK without using the insertion guide. Further, the installation position of the pump unit 11c can be set substantially at the center of the fuel tank TK in the longitudinal direction.

Fourth Embodiment

Figure 20:
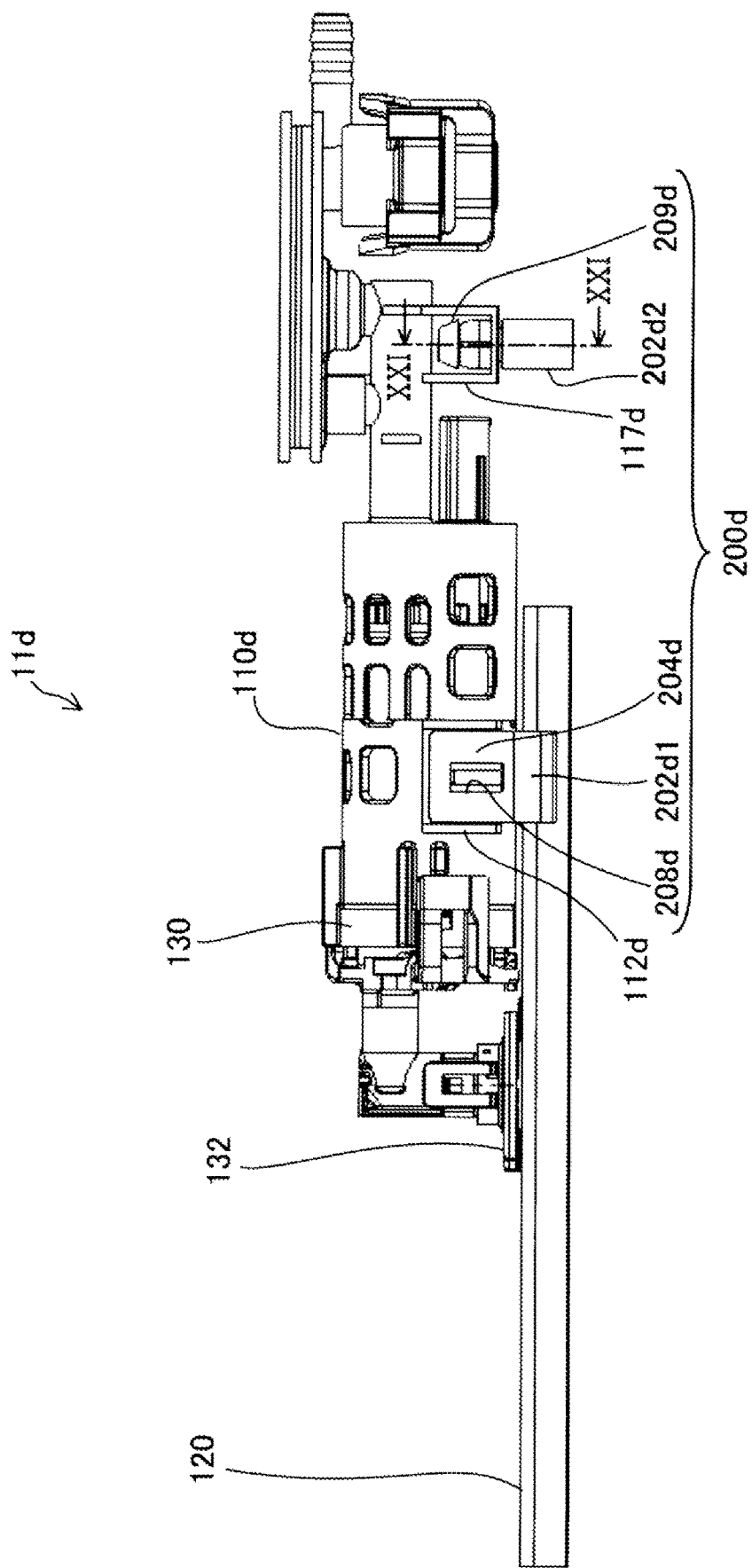
FIG. 20 is an explanatory view illustrating a pump unit according to a fourth embodiment.

FIG. 20 illustrates a pump unit 11d of the fourth embodiment. The housing 110d of the pump unit 11d includes the first guide portion 112d and the snap-fit portion 114c1, but does not include the snap-fit portion 114c2. Instead, the housing 110d includes a second guide portion 117d in the first passage 151. The second guide portion 117d has a tubular shape, and is open in the −z direction. In other words, the second guide portion 117d is open toward the fixing member 200d.

The fixing member 200d includes the base portions 202d1 and 202d2, the first rail 204d, the locking portion 208d, and the second rail 209d. The first rail 204d and the locking portion 208d have the same configuration as the rail 204c1 and the locking portion 208c of the third embodiment. The base portion 202d2 has a substantially columnar shape, and has the second rail 209d at the upper end. The second rail 209d is inserted into the second guide portion 117d of the housing 110d.

Figure 21:
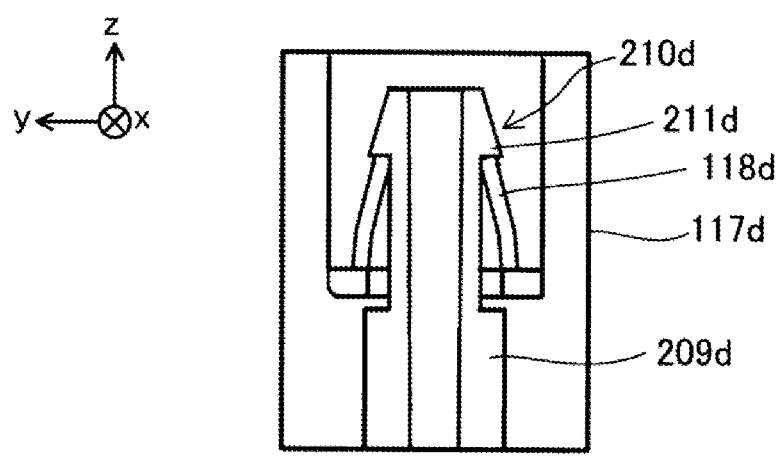
FIG. 21 is a view taken along a plane corresponding to a line XXI-XXI in FIG. 20, illustrating a second guide portion according to the fourth embodiment.

FIG. 21 illustrates a schematic view of the second guide portion 117d. The second guide portion 117d has a cylindrical shape and is open in the −z direction. The second guide portion 117d includes a locking portion 118d that is narrowed in the +z direction. The second rail 209d has the snap-fit portion 210d at the tip end in the +z direction. The snap-fit portion 210d has the nail 211d able to be engaged with the locking portion 118d. When the second rail 209d is inserted into the second guide portion 117d, the snap-fit portion 210d is elastically deformed inward, so that the locking portion 118d can be positioned on the −z side of the nail 211d in the −z direction. When the locking portion 118d is located on the −z side with respect to the nail 211d, the locking portion 118d and the nail 211d engage with each other, so that the second guide portion 117d cannot be disengaged from the second rail 209d.

According to the fourth embodiment, the pump unit can be fixed to the fixing member of the fuel tank TK without using the insertion guide. Further, the installation position of the pump unit can be set substantially at the center of the fuel tank TK in the longitudinal direction.

Modification of Fourth Embodiment

Figure 22:
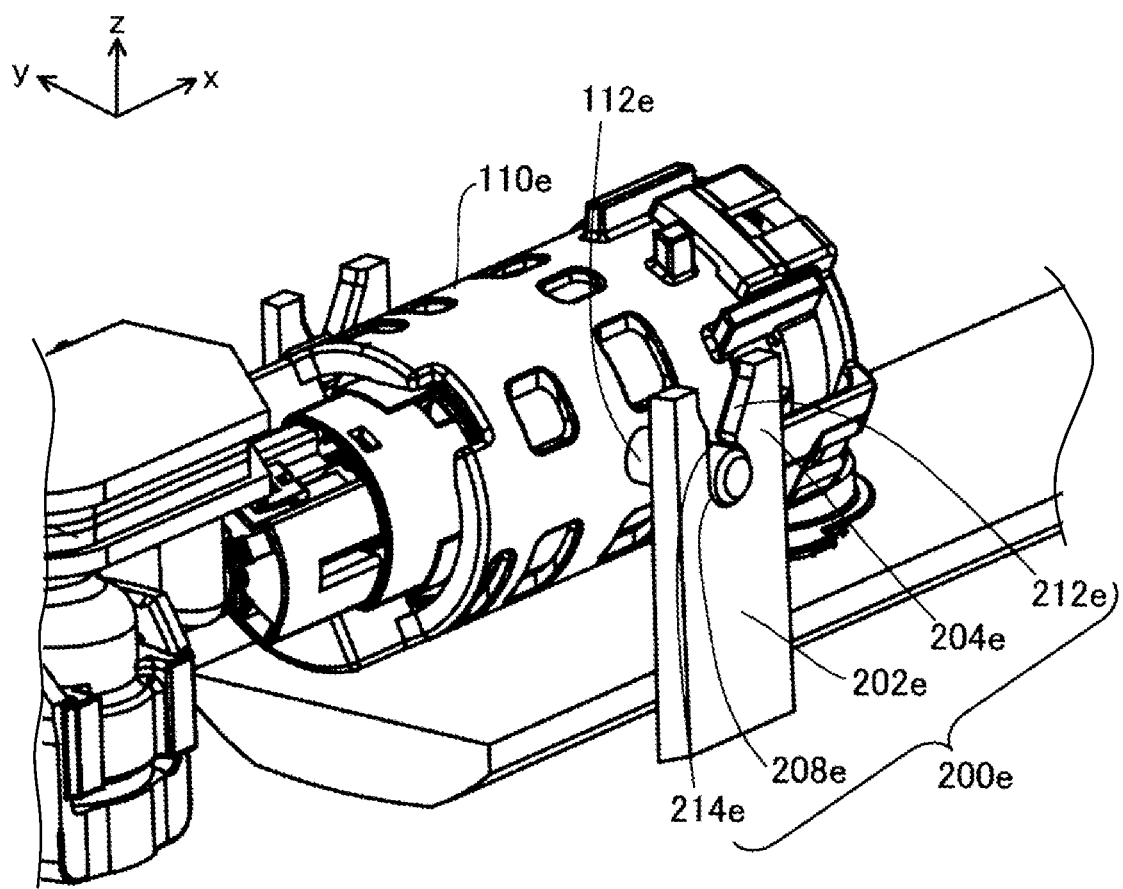
FIG. 22 is a perspective view illustrating a pump unit according to a modification of the fourth embodiment.

FIG. 22 illustrates the first guide portion 112e and the first rail 204e according to a modification of the fourth embodiment. The first guide portion 112e has a bar shape protruding from the pump holding portion 111e of the housing in the +y direction and the −y direction. The fixing member 200e includes the base portion 202e, the first rail 204e, the locking portion 208e, and the slope portion 212e. The end pf the first rail 204e in the +z direction is separated into two pieces, and the locking portion 208e is located at the branch point between the two pieces. The locking portion 208e has a substantially circular shape so that the first guide portion 112e can be received by the locking portion 208e. The slope portion 212e is formed on the +z side of the locking portion 208e. The slope portion 212e has slope surfaces formed on the +z side of the locking portion 208e of the first rail 204e. An interval between the slope surfaces of the slope portion 212e in the x direction is larger at the end in the +z direction, and is made narrower toward the locking portion 208e. Therefore, the slope portion 212e can guide the first guide portion 112e along the slope surfaces. A narrowed portion 214e is formed between the locking portion 208e and the slope portion 212e. An interval of the narrowed portion 214e is slightly smaller than the diameter of the first guide portion 112e. Therefore, the first guide portion 112e inserted into the locking portion 208e can be restricted from coming off easily.

According to the modification, the pump unit can be fixed to the fixing member of the fuel tank TK without using the insertion guide. Further, the installation position of the pump unit can be set substantially at the center of the fuel tank TK in the longitudinal direction.

Figure 23:
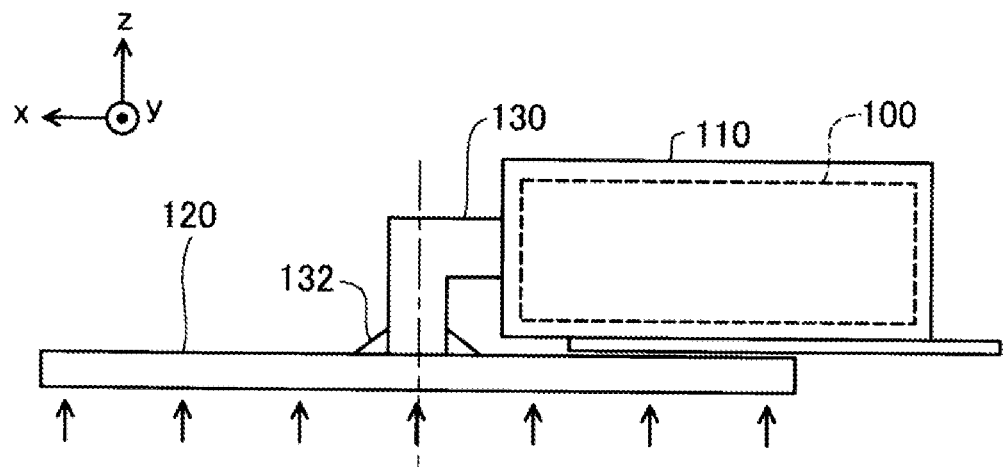
FIG. 23 is an explanatory view illustrating a filter and a cap.

In FIG. 23, the cap 132 is located approximately at the center of the filter 120 in the longitudinal direction (the x direction). In this case, the fuel is sucked into the fuel pump 100 from substantially the center of the filter 120. Therefore, even if the fuel in the fuel tank TK is biased due to acceleration/deceleration or tilting of the vehicle while the vehicle is travelling, the fuel pump module can stably suck the fuel from the filter 120.

Figure 24:
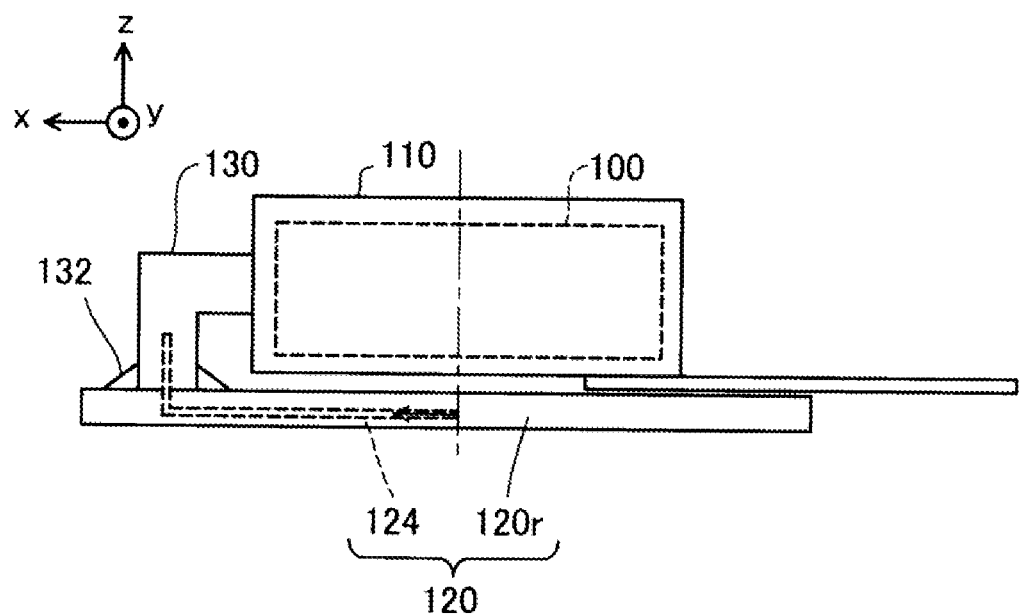
FIG. 24 is an explanatory view illustrating a filter and a cap when the filter is held by a housing.

In FIG. 24, the cap 132 is located adjacent to the end of the filter 120 in the longitudinal direction (the x direction). The housing 110 is located on the +z side of the filter 120. The filter 120 includes a suction pipe 124 inside the filter body 120r that filters fuel. The suction pipe 124 connects the cap 132 with the center of the filter body 120r in the longitudinal direction. Fuel is sucked into the fuel pump 100 through the suction pipe 124. With this configuration, the filter body 120r can be pressed by the cap 132 and the housing 110. Therefore, the filter body 120r is not easily deformed, and the fuel can be sucked stably. Further, since one end of the suction pipe 124 is located substantially at the center of the filter body 120r, the fuel is made to move toward substantially the center of the filter body 120r. The fuel is sucked into the fuel pump 100 through the suction pipe 124 from approximately the center of the filter body 120r. Therefore, even if the fuel is biased in the fuel tank TK due to acceleration/deceleration or tilting of the vehicle traveling, the fuel pump module can stably suck the fuel from the filter 120.

The present disclosure should not be limited to the embodiments described above, and various other embodiments may be implemented without departing from the scope of the present disclosure. For example, the technical features in the embodiments can be replaced or combined as appropriate. Also, if the technical features are not described as essential in the present specification, they can be deleted as appropriate.

What is claimed is:

1. A fuel pump module comprising:
a pump unit including a fuel pump configured to pump fuel out of a fuel tank, a housing that holds the fuel pump, and a filter configured to filter the fuel;
a lid provided on the fuel tank to close an opening of the fuel tank, which serves as an inlet when the pump unit is arranged in the fuel tank, the lid having a discharge port to supply the fuel to outside of the fuel tank; and
a flexible fuel tube connecting the pump unit and the discharge port, wherein
the housing includes
a guide portion configured to fix the pump unit to a fixing member having a pair of rails provided in the fuel tank, and
a separation regulating member configured to regulate the guide portion from separating from the pair of rails by engaging with the fixing member; and
a position of the guide portion in the height direction is formed within a range from a center of a minimum inscribed circle of the pump unit to ¼ of a height of the minimum inscribed circle.

2. The fuel pump module according to claim 1, wherein a tip end of the guide portion to be inserted toward the rails is located to face the lid.

3. The fuel pump module according to claim 1, wherein the housing includes two of the guide portions, and
one of the two guide portions is provided on a side surface of a pump holding portion that holds the fuel pump.

4. The fuel pump module according to claim 1, wherein the separation regulating member has a snap-fit portion.

5. The fuel pump module according to claim 1, wherein the filter has a filter body configured to filter the fuel, and
an intake pipe connecting the filter body and the fuel pump, and
an end of the intake pipe adjacent to the filter body is located at a center of the filter body.

6. A fuel supply device comprising:
a fuel tank;
a fixing member fixed to the fuel tank; and
the fuel pump module which is fixed to the fixing member, wherein
the fuel pump module comprises:
a pump unit including a fuel pump configured to pump fuel out of the fuel tank, a housing that holds the fuel pump, and a filter configured to filter the fuel;
a lid provided on the fuel tank to close an opening of the fuel tank, which serves as an inlet when the pump unit is arranged in the fuel tank, the lid having a discharge port to supply the fuel to outside of the fuel tank; and
a flexible fuel tube connecting the pump unit and the discharge port, wherein
the housing includes
a guide portion configured to fix the pump unit to the fixing member having a pair of rails provided in the fuel tank, and
a separation regulating member configured to regulate the guide portion from separating from the pair of rails by engaging with the fixing member,
the filter is arranged along a longitudinal direction of the fuel tank,
a center of the filter in the longitudinal direction is located at a position which coincides with a center of the fuel tank in the longitudinal direction,
a bottom surface of the filter is in contact with an inner bottom surface of the fuel tank; and
a position of the guide portion in the height direction is formed within a range from a center of a minimum inscribed circle of the pump unit to ¼ of a height of the minimum inscribed circle.

7. The fuel supply device according to claim 6, wherein the filter is disposed between the rails and the inner bottom surface of the fuel tank.

8. A method of installing the fuel pump module according to claim 1 in the fuel tank, the method comprising:
disposing the fixing member having the pair of rails on an inner bottom surface of the fuel tank; and
installing the fuel pump into the fuel tank through an opening of the fuel tank in a state where the fuel pump is held in the housing having the guide portion, wherein
the installing includes
moving the fuel pump beyond the fixing member,
moving the fuel pump downward in a vertical direction, and
fitting the guide portion and the rails by moving the fuel pump toward the opening.

* * * * *